(12) United States Patent
Didden et al.

(10) Patent No.: US 10,933,591 B2
(45) Date of Patent: Mar. 2, 2021

(54) LASER JOINING METHOD AND LASER JOINING DEVICE FOR FUSING WORKPIECES

(71) Applicant: Leister Technologies AG, Kägiswil (CH)

(72) Inventors: Thomas Didden, Ennetburgen (CH); Carsten Wenzlau, Alpnach-Dorf (CH); Pascal Pfleger, Sachseln (CH)

(73) Assignee: Leister Technologies AG, Kägiswil (CH)

( * ) Notice: Subject to any disclaimer, the term of this patent is extended or adjusted under 35 U.S.C. 154(b) by 283 days.

(21) Appl. No.: 15/942,531

(22) Filed: Apr. 1, 2018

(65) Prior Publication Data

US 2018/0311904 A1 Nov. 1, 2018

(30) Foreign Application Priority Data

Apr. 28, 2017 (EP) .................................... 17168659

(51) Int. Cl.
*B29C 65/16* (2006.01)
*B23K 26/57* (2014.01)
(Continued)

(52) U.S. Cl.
CPC ........ *B29C 65/1641* (2013.01); *B23K 26/324* (2013.01); *B23K 26/57* (2015.10);
(Continued)

(58) Field of Classification Search
CPC . B29C 65/16; B29C 65/1641; B29C 65/1635; B29C 65/1654; B29C 65/168;
(Continued)

(56) References Cited

U.S. PATENT DOCUMENTS 6,465,757 B1 * 10/2002 Chen .................... B23K 26/066
219/121.63
2004/0080573 A1 * 4/2004 Buchanan ......... B29C 66/81431
347/47

(Continued)

FOREIGN PATENT DOCUMENTS

EP 0 997 261 A1 5/2000
EP 2 949 452 A1 12/2015
(Continued)

OTHER PUBLICATIONS

Search Report for corresponding European App. No. 17 168 659.5, dated Oct. 10, 2017.

*Primary Examiner* — Daniel McNally
(74) *Attorney, Agent, or Firm* — Renner, Otto, Boisseile & Sklar, LLP (57) ABSTRACT

A laser joining method and device includes a pressure-applying clamping device, which presses a first and a second workpiece against one another at least after the workpieces have been locally plasticized, and a mask having mask structures, which allow laser light to pass only in the region of the bonding contact faces, wherein at least the workpiece facing the laser source is formed by a three-dimensional molded part, which is not planar at least on the first contour side facing the clamping element and/or on the second contour side facing the second workpiece, and wherein the clamping element, with the bearing side thereof for the first workpiece, is adapted to the first contour side of the first workpiece. The mask structures are created on the bearing side of the clamping element facing the first workpiece or on the second contour side of the first workpiece facing the second workpiece.

8 Claims, 5 Drawing Sheets

(51) Int. Cl.
  *B23K 26/324* (2014.01)
  *B29C 65/00* (2006.01)
(52) U.S. Cl.
  CPC ........ *B29C 65/168* (2013.01); *B29C 65/1635* (2013.01); *B29C 65/1654* (2013.01); *B29C 65/1683* (2013.01); *B29C 65/1696* (2013.01); *B29C 66/112* (2013.01); *B29C 66/1122* (2013.01); *B29C 66/12449* (2013.01); *B29C 66/12463* (2013.01); *B29C 66/12469* (2013.01); *B29C 66/131* (2013.01); *B29C 66/3494* (2013.01); *B29C 66/5346* (2013.01); *B29C 66/54* (2013.01); *B29C 66/74* (2013.01); *B29C 66/81267* (2013.01); *B29C 66/8122* (2013.01); *B29C 66/81268* (2013.01)
(58) Field of Classification Search
  CPC ............ B29C 65/1683; B29C 65/1696; B29C 66/112; B29C 66/1122; B29C 66/12449; B29C 66/12463; B29C 66/12469; B29C 66/131; B29C 66/3494; B29C 66/5346; B29C 66/54; B29C 66/74; B29C 66/81267; B23K 26/57; B23K 26/324
  See application file for complete search history.

(56) References Cited

U.S. PATENT DOCUMENTS

| | | |
|---|---|---|
| 2006/0134994 A1 | 6/2006 | Yasuda |
| 2012/0024709 A1* | 2/2012 | Sung ........................ C25D 1/10 205/50 |
| 2015/0343701 A1 | 12/2015 | Schiccheri |

FOREIGN PATENT DOCUMENTS

| | | |
|---|---|---|
| JP | 2007 313821 A | 12/2007 |
| JP | 2009 056755 A | 3/2009 |
| JP | 2012 187897 A | 10/2012 |
| WO | 2017/020890 A1 | 2/2017 |

* cited by examiner

LASER JOINING METHOD AND LASER JOINING DEVICE FOR FUSING WORKPIECES

CROSS REFERENCE TO RELATED APPLICATION

This application claims priority under 35 USC § 119 to European Patent Application No. 17 168 659.5, filed Apr. 28, 2017, the entire disclosure of which is incorporated herein by reference.

Technical Field

The invention relates to a laser joining method for bonding different workpieces made of plastic material, or plastic material together with other materials, wherein the first workpiece facing the laser source is made of a material transparent to the laser beam and the other second workpiece is made of a material absorbent to the laser beam, or a material that is transparent to the laser beam and includes an absorbing coating or an absorbing intermediate film, so that the bonding contact faces of the two workpieces abutting one another melt under the action of laser light and bond to one another during the subsequent cooling process under pressure application, and the workpieces to be bonded are pressed against one another by way of a clamping device for pressure application, for which purpose the workpieces are disposed between a support element and a clamping element, to which a clamping force can be applied and which extends across the first workpiece and is substantially transparent to laser light, and wherein a mask having mask structures is used, which allows laser light to pass only in the region of the bonding contact faces so as to plasticize only the bonding contact faces on the second workpiece, wherein the mask structures are larger than the wavelength of the laser beam used, and the laser beam is either line-shaped and moved relative to the workpieces and the mask, or is areal and directed in a stationary manner at the workpieces and the mask, and wherein at least the first workpiece facing the laser source is formed by a three-dimensional molded part, which is not planar at least on the first contour side facing the clamping element and/or on the second contour side facing the second workpiece, and the clamping element is adapted, on the bearing side thereof, to the first contour side of the first workpiece.

The invention moreover relates to a laser joining device for bonding different workpieces made of plastic material, or plastic material together with other materials, which is suitable for carrying out the method described above.

Background Art

Laser transmission welding using a mask (mask welding) for shadowing the regions not to be fused constitutes the state of the art and is used successfully, in particular with 2D workpieces or with relatively flat 3D workpieces. By way of a line-shaped laser beam, the information from the structured mask is transferred to the workpieces located beneath. In the region of the structured areas of the mask, the laser radiation is transmitted and impinges on the workpieces, while the workpieces are shadowed in the region of the unstructured surface of the mask, and laser radiation thus does not reach the workpieces. A metallized glass plate is frequently used as a mask, into which information regarding the welding contour is introduced by way of structuring. This can be done, for example, by way of etching or laser ablation.

A laser joining method of the type in question and a device for bonding different workpieces made of plastic, or plastic material together with other materials, is known from EP 0 997 261 A1, wherein the upper workpiece facing the laser source is made of a material transparent to the laser beam, and the second workpiece is made of a material absorbent to the laser beam, so that the contact faces of the two workpieces abutting one another melt and bond with one another during the subsequent cooling process under pressure. A mask made of a material that does not allow the laser to pass is disposed between the laser source and the workpieces to be bonded so as to bond the workpieces in a certain joining region of the contact face, the mask having mask structures larger than the wavelength of the laser beam used, wherein the laser source is set with respect to the contact face such that a line is created thereon, and the laser beam and the mask are moved together with the workpieces, or the laser beam is moved together with the mask and the workpieces.

However, if at least the first transparent 3D workpiece does not have a relatively flat design, but has a height of several centimeters, and the workpieces to be bonded include, in particular, distinct free-form surfaces that are inclined with respect to the horizontal, the conventional mask welding process known from EP 0 997 261 A1 reaches its limit. This is caused by the fact that, with this conventional mask welding, the mask is located above the highest point of the free-form surface, and is generally disposed at a vertical distance therefrom. Due to a divergence of the laser beam that cannot be entirely avoided, the further the mask is located away from the welding plane, the smaller the structure of the mask must be selected to represent the required projection. Moreover, the further the mask is located away from the welding plane, the more likely the projection is to experience disturbances from refractions on different materials between the mask and the welding plane. The projection accuracy thus grows worse as the distance between the mask and the welding plane increases, and is additionally dependent on the divergence of the radiation source. In conventional mask welding, the size of the structure, the shadowed areas, and the workpiece height thus play an important role and constitute essential limits in terms of the ability to apply the process.

SUMMARY

Proceeding from this, it is the object of the invention to refine the known mask welding process so that it is also possible to efficiently and reliably fuse 3D workpieces that do not have a relatively flat design, specifically those comprising distinct free-form surfaces, in particular on the upper side of the transparent workpiece facing the laser.

This object is achieved according to the invention by a laser joining method and laser joining device having the features described herein.

In the disclosed laser joining method for bonding different workpieces made of plastic material, or plastic material together with other materials, according to the invention, the mask structures are created on the bearing side of the clamping element facing the first workpiece and/or on the second contour side of the first workpiece facing the second workpiece.

For this purpose, workpieces are used wherein the first workpiece facing the laser source is made of a material transparent to the laser beam, and the other second workpiece is made of a material absorbent to the laser beam, or a material that is transparent to the laser beam and includes an absorbing coating or an absorbing intermediate film, so that the bonding contact faces of the two workpieces abutting one another melt under the action of laser light and bond to one another during the subsequent cooling process under pressure application. The workpieces to be bonded are pressed against one another by way of a clamping device for pressure application, wherein the workpieces are disposed between a support element and a clamping element, to which a clamping force can be applied, and which extends across the first workpiece and is substantially transparent to laser light.

The mask structures on the bearing side of the clamping element facing the first workpiece and/or on the second contour side of the first workpiece facing the second workpiece allow laser light to pass only in the region of the bonding contact faces, so as to plasticize only the bonding contact faces on the second workpiece, wherein the mask structures are larger than the wavelength of the laser beam used. In the laser joining method according to the invention, a laser beam having a line shape or an areal shape is used. In the first case, the laser beam is moved relative to the workpieces and the mask, and in the second case, the laser beam is directed in a stationary manner at the workpieces and the mask. In the two cases described above, a first workpiece facing the laser source is used, which is designed as a three-dimensional molded part. This three-dimensional molded part is not planar on the first contour side facing the clamping element and/or on the second contour side facing the second workpiece, which is to say the part includes protrusions and/or recesses there. The clamping element, on the bearing side thereof for the first workpiece, is adapted to the first contour side of the first workpiece, which is to say on the side facing away from the second workpiece. If the first workpiece is designed without depressions and elevations on the side pointing toward the laser source, so that the corresponding first contour side is planar, the associated bearing side of the clamping element likewise preferably has a planar design. If the first workpiece includes depressions and elevations on the side pointing toward the laser source, the bearing side of the clamping element facing this first contour side preferably correspondingly has a design that is not planar. This not only causes the clamping element to bear completely against the first workpiece, but also causes the clamping force to be evenly applied to the first workpiece, whereby the two workpieces are clamped between the support element and the clamping element of the clamping device such that substantially identical contact pressure is present, and can be maintained, everywhere on the bonding contact faces of the workpieces.

By creating the mask structures on the bearing side of the clamping element facing the first workpiece and/or on the second contour side of the first workpiece facing the second workpiece, the mask structures are disposed at the highest point of the free-form surface of the first workpiece and/or beneath the same. In spite of not being able to entirely avoid divergence of the laser beam, the risk of potential refractions on different materials between the mask and the welding plane is reduced, and the projection accuracy in the region of the bonding contact faces of the workpieces is thereby improved.

The bearing side of the clamping element against the facing first contour side of the first workpiece is preferably at least partially implemented as a negative mold of the facing first contour side of the first workpiece. In this way, it is achieved that the clamping element and the first workpiece mutually support one another across the entire bearing side of the clamping element and the entire first contour side of the first workpiece pointing to the laser source, so that the first workpiece, which in general is more flexible in relation to the clamping element, is held in a dimensionally stable manner.

In a preferred embodiment of the laser joining method according to the invention, material that does not allow laser light to pass is applied to the bearing side of the clamping element facing the first workpiece, or to the second contour side of the first workpiece facing the second workpiece, for creating the mask structures. The material that does not allow laser light to pass causes the workpieces to be shadowed adjacent to the bonding contact faces of the workpieces and keeps the laser light of the laser beam away from at least the second workpiece, which is made of a material absorbent to the laser beam, or a material that is transparent to the laser beam and includes an absorbing coating or an absorbing intermediate film. For example, material absorbing laser light or material scattering or reflecting laser light may be used as the material that does not allow laser light to pass. Preferably, material reflecting laser light is used to create the mask structures. This has the advantage that neither the clamping element nor the first workpiece is heated locally by the laser beam.

In an advantageous embodiment of the laser joining method according to the invention, the lateral surface of the clamping element facing the laser source has a planar design, and the laser radiation is directed approximately perpendicularly at this lateral surface. This favors the penetration of the laser beam through the clamping element and prevents undesirable back-reflections, scattering and diffraction of the laser light of the laser beam on the lateral surface of the clamping element facing the laser source.

According to the invention, in the disclosed laser joining device for bonding different workpieces made of plastic material, or plastic material together with other materials, the mask structures are created on the bearing side of the clamping element facing the first workpiece and/or on the second contour side of the first workpiece facing the second workpiece. The bearing side of the clamping element against the facing first contour side of the first workpiece is preferably at least partially implemented as a negative mold of the facing first contour side of the first workpiece. It has proven to be particularly advantageous when the created mask structures comprise material that does not allow laser light to pass, which is disposed on the bearing side of the clamping element facing the first workpiece and/or on the second contour side of the first workpiece facing the second workpiece. Material reflecting laser light is particularly suitable for the created mask structures. Furthermore, it is useful to design the lateral surface of the clamping element facing the laser source to be planar, and to direct the laser radiation approximately perpendicularly at this lateral surface.

The laser joining method according to the invention, or the laser joining device according to the invention, in particular, covers the following three cases, namely: welding in a plane with a 3D molded, transparent workpiece and pressing in a plane; the welding in a plane with a 3D molded, transparent workpiece and pressing by the 3D molded, transparent workpiece; and welding of free-form surfaces in the absorbing and transparent workpieces and pressing by the 3D molded, transparent workpiece.

The invention is based on the following three interconnected core ideas.

The first is to design the clamping element of the clamping device as a 3D punch, which is made of plastic material transparent to the laser radiation. This is designed as a negative mold of the transparent first workpiece, including demolding tolerances and a planar surface located orthogonal to the laser entry side. However, instead of disposing a mask at the top, analogously to conventional mask welding, on the side of the clamping device facing the laser source, the areas of the workpieces not to be fused are preferably provided with a reflective coating directly on the negative side of the 3D clamping element. In this way, the welding information is transferred directly, and thus optimally, over the welding plane. At the same time, pressing is carried out directly over the welding plane. The 3D punch is thereby expanded into a 3D mask.

The second is to design the clamping element of the clamping device as a 3D punch, which is made of plastic material transparent to the laser radiation. This is designed as a negative mold of the transparent first workpiece, including demolding tolerances and a planar surface located orthogonal to the laser entry side. However, instead of disposing a mask at the top, analogously to conventional mask welding, on the side of the clamping device facing the laser source, the areas of the workpieces not to be fused are preferably provided with a reflective coating directly on the side of the 3D workpiece transparent to laser light facing the second absorbing workpiece, which is to say on the side of the first workpiece facing away from the 3D punch. The first 3D workpiece is thus expanded into a 3D mask.

The third, in the case where the first workpiece is formed by a 3D workpiece that has a completely planar design on the side pointing to the laser source, is to design the clamping element of the clamping device as a 2D punch, which is made of material transparent to the laser radiation. This is designed correspondingly to the transparent first workpiece, a planar surface located orthogonal to the laser entry side. However, instead of disposing a mask at the top, analogously to conventional mask welding, on the side of the clamping device facing the laser source, the areas of the workpieces not to be fused are preferably provided with a reflective coating directly on the side of the 3D workpiece transparent to laser light facing the second absorbing workpiece, which is to say on the side of the first workpiece facing away from the 2D punch. The first 3D workpiece is thus expanded into a 3D mask.

The advantages of the invention are an improved mask welding method, which is provided, in particular, for bonding different workpieces made of plastic material, or plastic material together with other materials, in which at least the first workpiece facing the laser source is a 3D workpiece transparent to laser light, by allowing higher speeds than conventional mask welding since the projection information is located closer to the second workpiece absorbing laser light, which can be designed as a 2D or as a 3D workpiece.

BRIEF DESCRIPTION OF THE DRAWINGS

The invention will be described hereafter in greater detail based on several exemplary embodiments illustrated in the drawings. Additional features of the invention will be apparent from the following description of the exemplary embodiment of the invention in conjunction with the claims and the accompanying drawings. The individual features of the invention can be implemented either alone or as several together in different embodiments of the invention. In the drawings in schematic cross-sectional illustrations:

DETAILED DESCRIPTION

Figure 1:
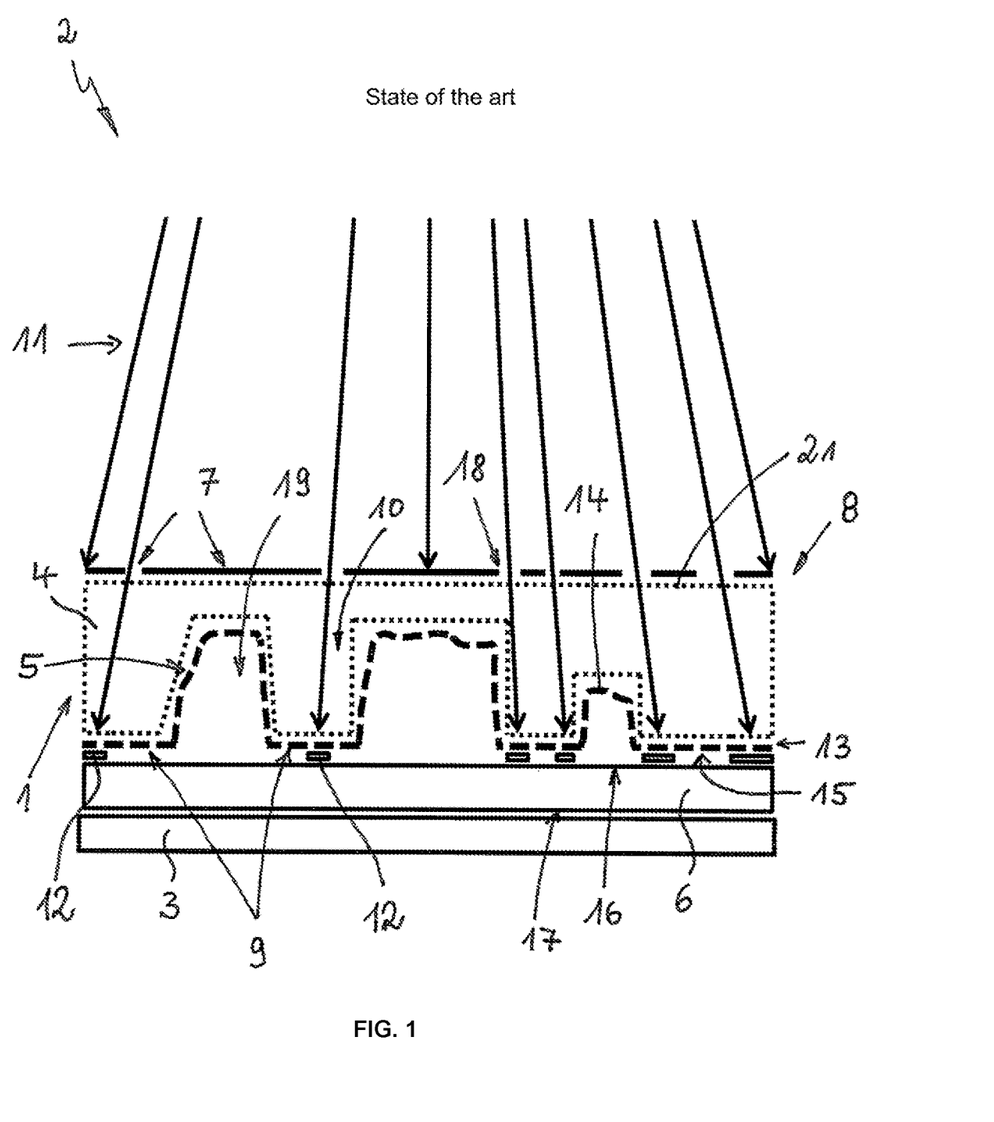
FIG. 1 shows a clamping device of a laser joining device known from the prior art, comprising two workpieces clamped between a support element and a clamping element of the clamping device, wherein the first workpiece is a 3D workpiece and the second workpiece is a 2D workpiece, and the mask structures are created on a mask that is disposed above the first workpiece, and wherein the bonding contact faces are located in the region of the depressions of the first workpiece.

FIG. 1 shows a clamping device 1 of a laser joining device 2 known from the prior art, comprising two workpieces 5, 6 clamped between a support element 3 and a clamping element 4 of the clamping device 1, wherein the first workpiece 5 is a 3D workpiece and the second workpiece 6 is a 2D workpiece, and the mask structures 7 are created in a mask 8 disposed above the first workpiece 5, and wherein the bonding contact faces 9 are located in the region of depressions 10 of the first workpiece 5. A line-shaped laser beam 11 is directed at the mask 8 having the mask structures 7, which originates from a laser source not shown in the figure and is moved relative to the workpieces 5, 6 and the mask 8. The first workpiece 5 facing the laser source 11 is made of a material transparent to the laser beam 11, and the other second workpiece 6 is made of a material absorbent to the laser beam 11. The mask 8 is translucent, partially translucent in the exemplary embodiment, in the region associated with the bonding contact faces 9, so that the mutually abutting bonding contact faces 9 of the two workpieces 5, 6 to be bonded melt under the action of the laser beam 11 and bond to one another during the subsequent cooling process under pressure application by way of the clamping device 1, wherein weld seams 12 are formed. The clamping element 4 is designed to allow laser light to pass and implemented as a negative mold of the 3D workpiece 5. On the side facing the first workpiece 5, the clamping element includes a bearing side 13, which is held bearing against a first contour side 14 of the first workpiece 5. The clamping element 4 moreover comprises a lateral surface 21 facing away from the workpiece 5, which has a planar design. The first workpiece 5 has a second contour side 15 that is located opposite the first contour side 14 and faces the second workpiece 6 and that has a first workpiece side 16 of the second workpiece 6 associated therewith. The second workpiece 6 has a second workpiece side 17, which is located opposite the first workpiece side 16 and by way of which the workpiece 6 is supported on the support element 3.

For the following description of the exemplary embodiments of the invention, the reference numerals that were used for the prior art are used for identical components/designations. The composition of the clamping device 1 and the shapes of the workpieces 5, 6 essentially correspond to the prior art, however the position of the mask 8 deviates therefrom.

Figure 2:
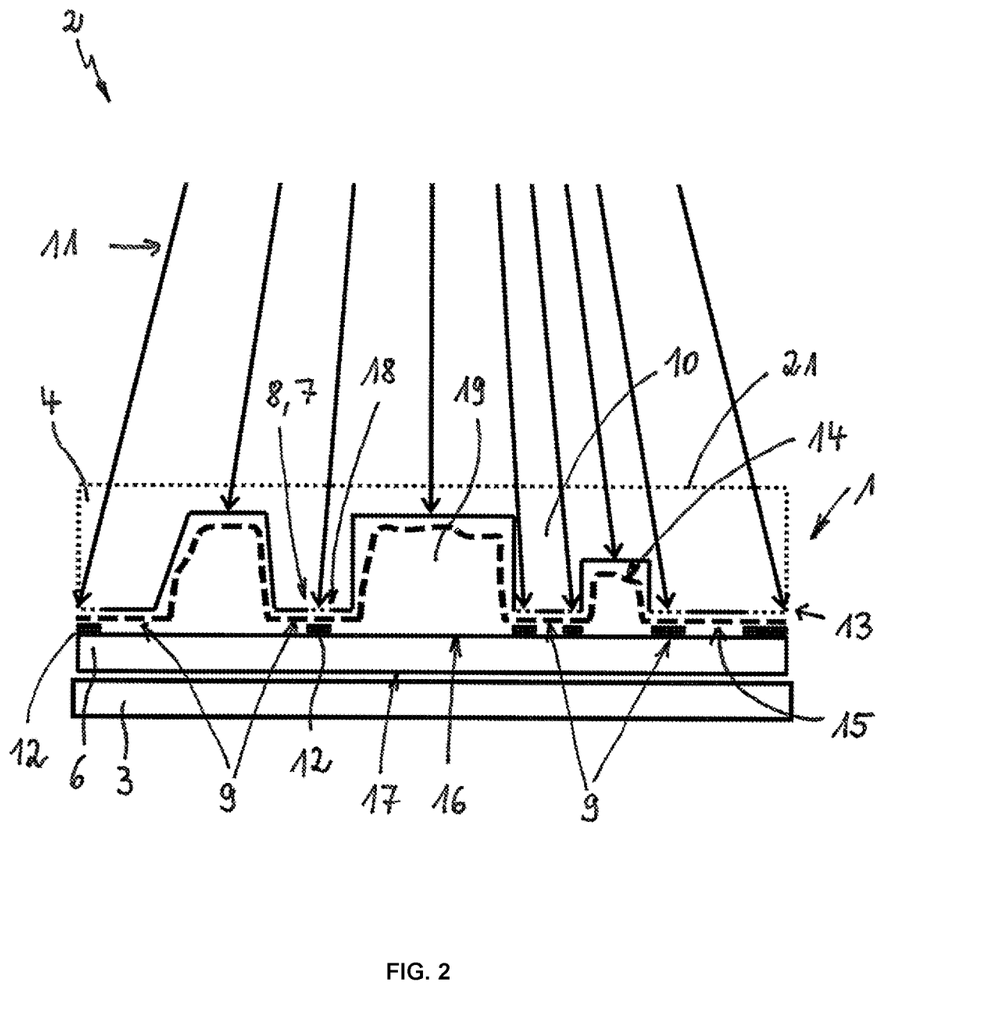
FIG. 2 shows a clamping device of the laser joining device according to the invention, comprising two workpieces clamped between a support element and a clamping element of the clamping device, wherein the first workpiece is a 3D workpiece and the second workpiece is a 2D workpiece, and the mask structures are created on the bearing side of the clamping element facing the first workpiece, and wherein the bonding contact faces are located in the region of the depressions of the first workpiece, and the mask has mask structure areas transparent to laser light, which are located in the region of the depressions of the first workpiece.

FIG. 2 shows a clamping device 1 of a laser joining device 2 according to the invention, comprising two workpieces 5, 6 clamped between a support element 3 and a clamping element 4 of the clamping device 1, wherein the first workpiece 5 is a 3D workpiece and the second workpiece 6 is a 2D workpiece, and the mask structures 7 of a mask 8 are created on the clamping element 4 on the bearing side 13 for the first contour side 14 of the first workpiece 5. In contrast to the prior art, the mask 8 is thus not disposed at a distance above the first workpiece 5, the distance there being caused by the clamping element 4, but rather is disposed directly in the vicinity of the first contour side 14 of the first workpiece 5, wherein the bonding contact faces 9 are located in the region of the depressions 10 of the first workpiece 5 on the second contour side 15 of the first workpiece 5 and on the first workpiece side 16 of the workpiece 6. A line-shaped laser beam 11 is directed at the clamping element 4 including the mask 8 having the mask structure 7, which originates from a laser source not shown in the figure and is moved relative to the workpieces 5, 6 and the clamping element 4. The first workpiece 5 facing the laser source 11 is made of a material transparent to the laser beam 11, and the other second workpiece 6 is made of a material absorbent to the laser beam 11. The mask 8 allows light to pass in the region of the bonding contact faces 9, so that the mutually abutting bonding contact faces 9 of the two workpieces 5, 6 to be bonded melt under the action of the laser light 11 and bond to one another during the subsequent cooling process under pressure application by way of the clamping device 1, wherein weld seams 12 are formed. The clamping element 4 is designed to allow laser light to pass and implemented as a negative mold of the 3D workpiece 5, wherein the mask 8 includes mask structure areas 18 that allow laser light to pass, which are located in the region of the depressions 10 of the first contour side 14 of the first workpiece 5 on the bearing side 13 of the clamping element 4.

Figure 3:
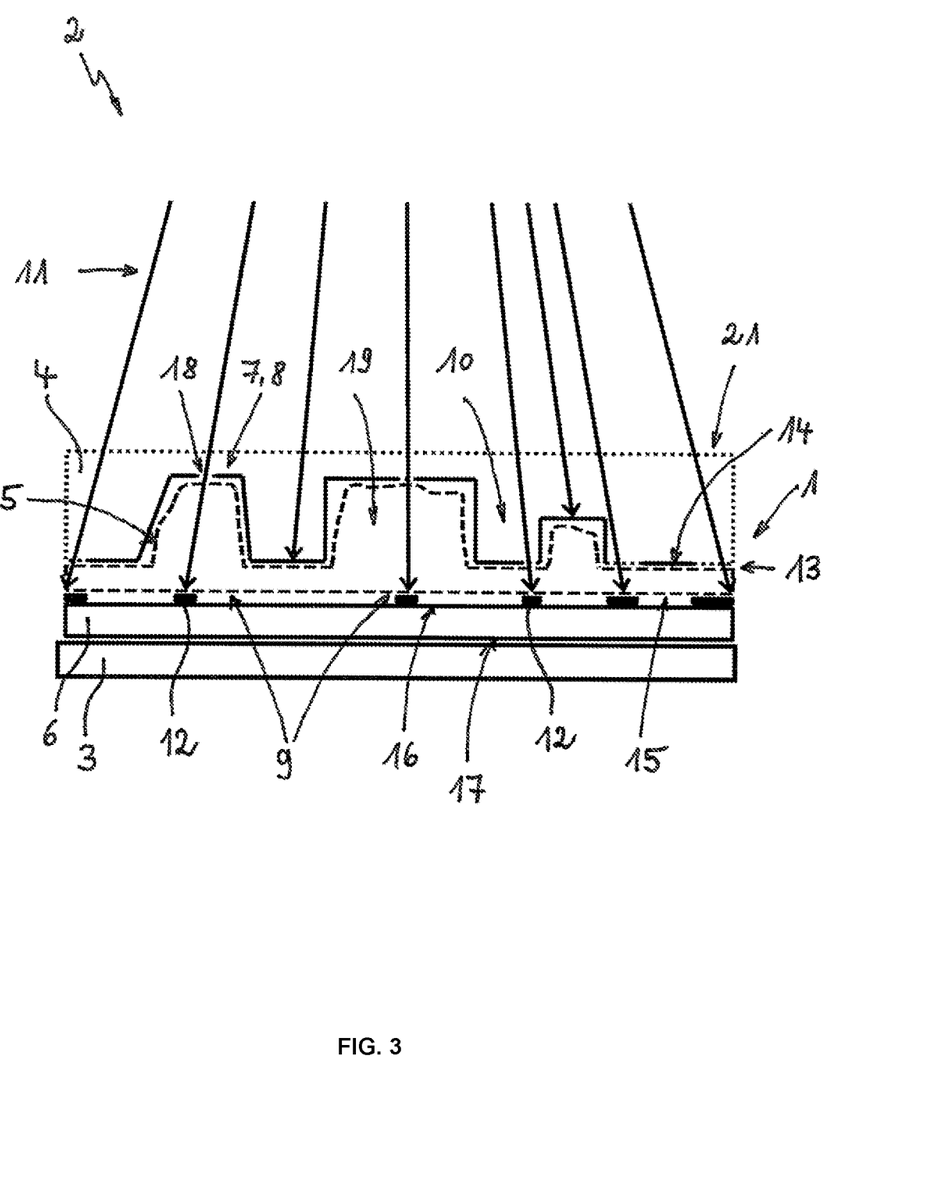
FIG. 3 shows a clamping device of the laser joining device according to the invention, comprising two workpieces clamped between a support element and a clamping element of the clamping device, wherein the first workpiece is a 3D workpiece and the second workpiece is a 2D workpiece, and the mask structures are created on the bearing side of the clamping element facing the first workpiece, and wherein the bonding contact faces are located in the region of the elevations and depressions of the first workpiece, and the mask has mask structure areas transparent to laser light, which are located in the region of the elevations and depressions of the first workpiece.

FIG. 3 shows a clamping device 1 of a laser joining device 2 according to the invention which corresponds substantially to the above-described embodiment according to FIG. 2. The only difference is that the mask 8 includes mask structure areas 18 that allow laser light to pass, which are not only located in the region of the depressions 10 of the first workpiece 5, but also in the region of elevations 19 of the first contour side 14 of the first workpiece 5.

Figure 4:
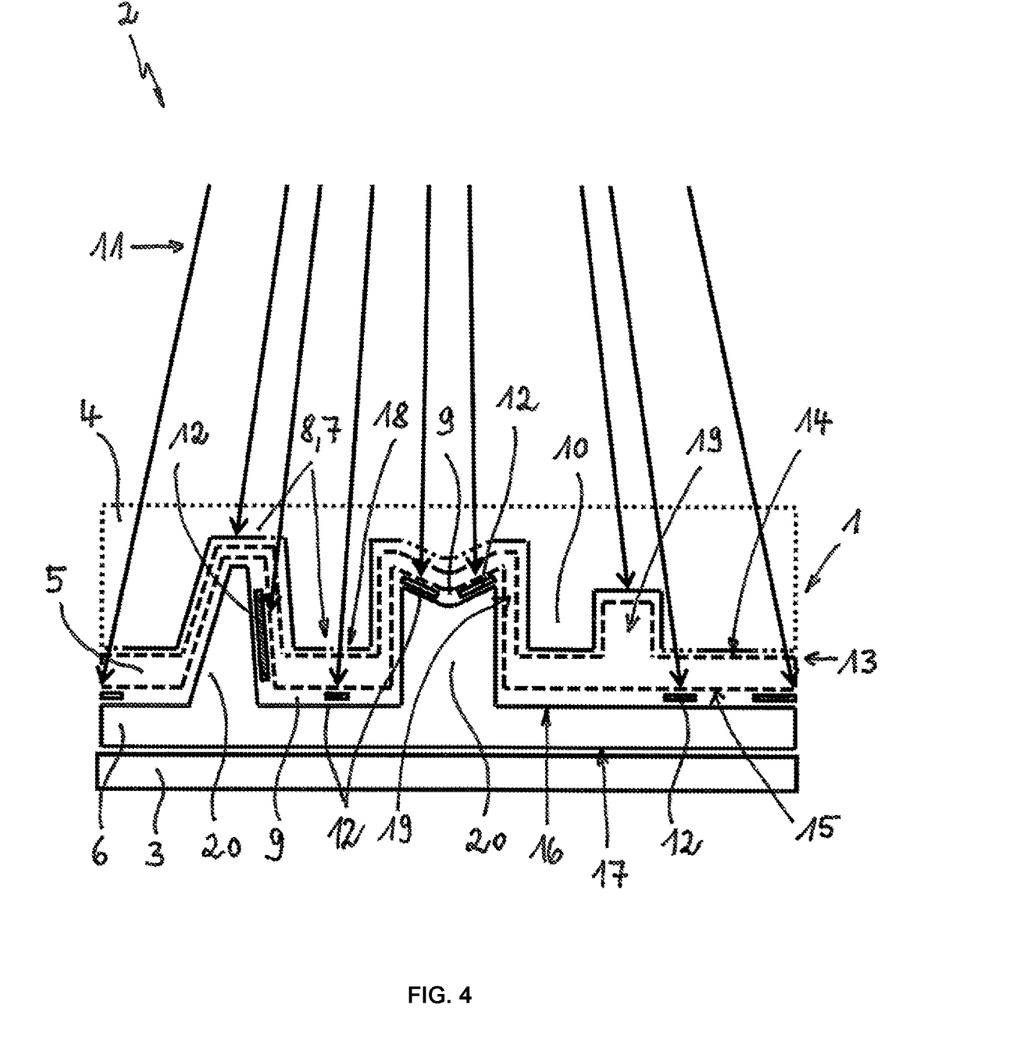
FIG. 4 shows a clamping device of the laser joining device according to the invention, comprising two workpieces clamped between a support element and a clamping element of the clamping device, wherein the first workpiece and the second workpiece are 3D workpieces, and the mask structures are created on the bearing side of the clamping element facing the first workpiece, and wherein the bonding contact faces are located in the region of the depressions and of the elevations of the first workpiece, and the mask has mask structure areas transparent to laser light, which are located in the region of the depressions and elevations of the first workpiece.

FIG. 4 illustrates a clamping device 1 of a laser joining device 2 according to the invention which results from the combination of the above-described embodiments according to FIGS. 2, 3, wherein the first workpiece 5 and the second workpiece 6 are 3D workpieces. The mask structures 7 are created on the bearing side 13 of the clamping element 4 facing the first workpiece 5, wherein the bonding contact faces 9 are provided in the region of the depressions 10 and of the elevations 18 of the first workpiece 5. The mask 8 includes mask structure areas 18 that allow laser light to pass, which are located in the region of the depressions 10 and of the elevations 19 of the first workpiece 5. On the workpiece side 16 directed toward the first workpiece 5, the second workpiece 6 has elevations 20 that engage in the elevations 19 of the first workpiece 5, from the second contour side 15 of the first workpiece 5.

Figure 5:
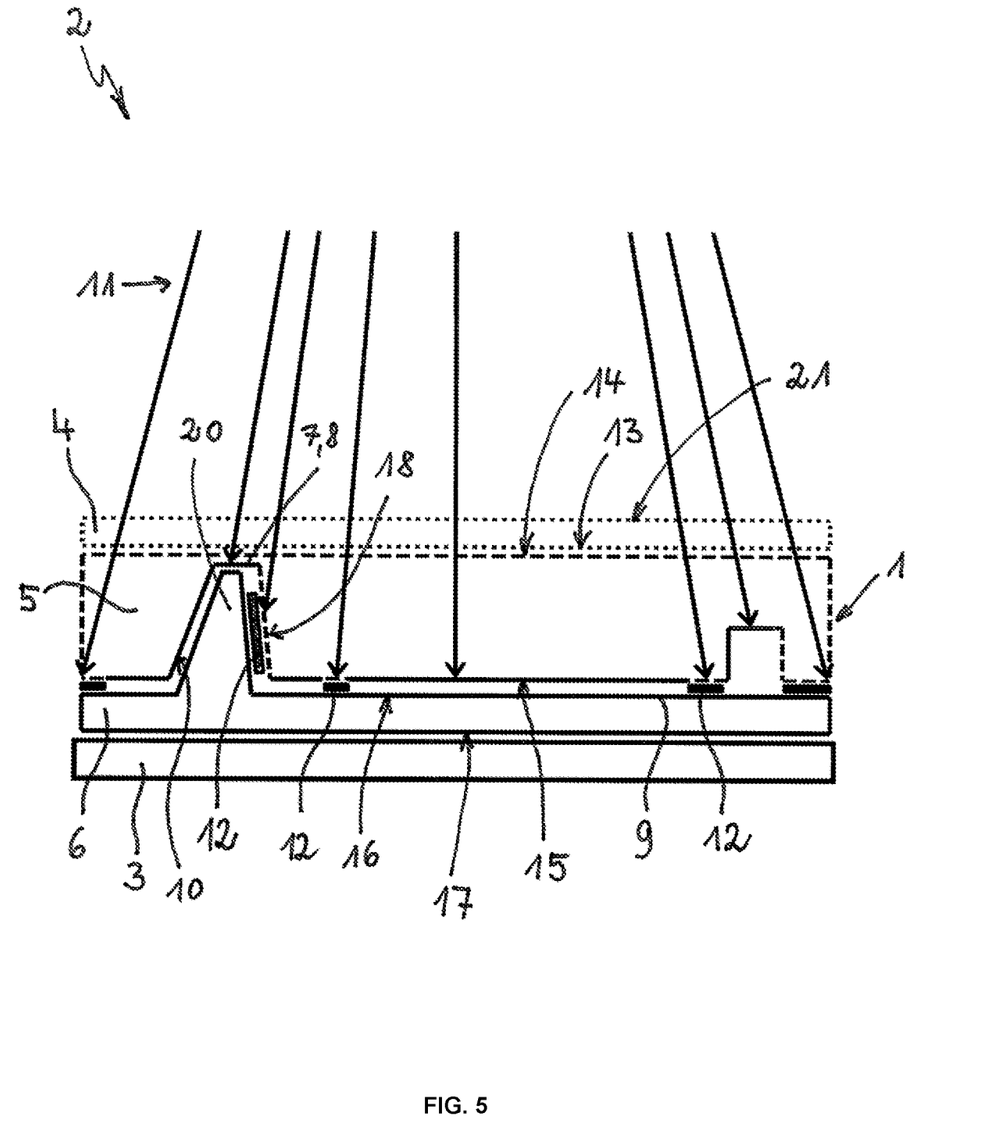
FIG. 5 shows a clamping device of the laser joining device according to the invention, comprising two workpieces clamped between a support element and a clamping element of the clamping device, wherein the first workpiece and the second workpiece are 3D workpieces, the first workpiece has a planar design in the direction of the clamping element, and the mask structures are created on the second contour side of the first workpiece facing the second workpiece, and wherein the bonding contact faces are located in the region of elevations of a workpiece side of the second workpiece pointing toward the first workpiece, and next thereto.

FIG. 5 shows a clamping device 1 of a laser joining device 2 according to the invention, which is a possible variant of the embodiment described in FIG. 4 when the first workpiece 5 has a planar design in the direction of the clamping element 4, which is to say when the workpiece 5 has a planar first contour side 14. The first workpiece 5 has depressions 10 on the second contour side 15 thereof, which engage in the elevations 20 of the second workpiece 6 projecting from the first workpiece side 16. According to the invention, the bearing side 13 of the clamping element 4 is generally adapted in all embodiments to the first contour side 14 of the first workpiece 5, so that the bearing side 13 of the clamping element 4 likewise has a planar design. In this way, a clamping plate having two plane parallel sides can be used as the clamping element 4. However, in this case the mask structures 7 are not provided on the bearing side 13 of the clamping element 4, but are created on the second contour side 15 of the first workpiece 5 facing the second workpiece 6, wherein the bonding contact faces 9 are located in the region of the depressions 10 of the first workpiece 5 and of elevations 20 of the second workpiece 6 and adjacent thereto.

The invention claimed is:

1. A laser joining method for bonding different workpieces made of plastic material, or plastic material together with other materials, a first workpiece facing a laser source being made of a material transparent to a laser beam and a second workpiece being made of a material absorbent to the laser beam, or a material that is transparent to the laser beam and includes an absorbing coating or an absorbing intermediate film, so that bonding contact faces of each of the first and second workpieces abutting one another melt under the action of laser light and bond to one another during a subsequent cooling process under pressure application, the workpieces to be bonded being pressed against one another by a clamping device for pressure application, for which purpose the workpieces are disposed between a support element and a clamping element, to which a clamping force can be applied and which extends across the first workpiece and is substantially transparent to laser light, and a mask having mask structures being used, which allows laser light to pass only in a region of the bonding contact faces so as to plasticize only the bonding contact faces on the second workpiece, the mask structures being larger than the wavelength of the laser beam used, and the laser beam being either line-shaped and moved relative to the workpieces and the mask, or being areal and directed in a stationary manner at the workpieces and the mask, and the clamping element being adapted, on a bearing side thereof for the first workpiece, to a first contour side of the first workpiece,     wherein at least the first workpiece facing the laser source being formed by a three-dimensional molded part, in which the first contour side facing the clamping element is non-planar such that the first contour side of the first workpiece includes at least one peak and includes at least one valley at a lower elevation than the at least one peak, and     wherein the mask structures are created on the bearing side of the clamping element facing the first workpiece such that at least one of the mask structures is at a protruding portion of the clamping element that is adapted to be received in the at least one valley of the first workpiece to thereby enable pressing and bonding of the first workpiece to the second workpiece by forming at least one of the bonding contact faces at a location that corresponds with the at least one valley of the first workpiece.

2. The method according to claim 1, wherein material that does not allow laser light to pass is applied to the bearing side of the clamping element facing the first workpiece for creating the mask structures.

3. The method according to claim 2, wherein material reflecting laser light is used to create the mask structures.

4. The method according to claim 1, wherein a lateral surface of the clamping element facing the laser source has a planar design, and the laser light is directed approximately perpendicularly at this lateral surface.

5. The method according to claim 1, wherein the bearing side of the clamping element for the first contour side of the first workpiece is at least partially implemented as a negative mold of the first contour side of the first workpiece.

6. The method according to claim 1, wherein the bearing side of the clamping element complements the first contour side of the first work piece.

7. The method according to claim 1, wherein the mask structures form a non-planar contoured surface that complements the first contour side of the first work piece.

8. The method according to claim 1, wherein the first contour side of the first workpiece deviates from a plane in which the workpiece is arranged by a multiple of the material thickness of the workpiece.

\* \* \* \* \*